(12) United States Patent
Tanaka et al.

(10) Patent No.: US 6,261,979 B1
(45) Date of Patent: Jul. 17, 2001

(54) FILTER MEDIUM AND AIR FILTER UNIT USING THE SAME

(75) Inventors: Osamu Tanaka; Toshio Kusumi; Yoshiyuki Shibuya; Takeshi Tano, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/319,097

(22) PCT Filed: Dec. 1, 1997

(86) PCT No.: PCT/JP97/04384

§ 371 Date: May 28, 1999

§ 102(e) Date: May 28, 1999

(87) PCT Pub. No.: WO98/26860

PCT Pub. Date: Jun. 25, 1998

(30) Foreign Application Priority Data

Dec. 4, 1996 (JP) ................................... 8-324366

(51) Int. Cl.[7] ........................... B01D 39/16; B01D 69/08; B01D 71/36; C08J 9/00

(52) U.S. Cl. .................. 442/370; 55/521; 210/493.5; 210/500.36; 428/182; 428/315.5

(58) Field of Search ............................ 442/370; 428/182, 428/315.5; 210/493.5, 500.36; 55/521

(56) References Cited

U.S. PATENT DOCUMENTS

| 4,588,646 | 5/1986 | Miyagi et al. . |
| 4,596,837 | 6/1986 | Yamamoto et al. . |
| 5,234,739 | 8/1993 | Tanaru et al. . |
| 5,366,631 | 11/1994 | Adiletta . |
| 5,409,515 | 4/1995 | Yamamoto et al. . |

FOREIGN PATENT DOCUMENTS

| 0 395 331 A1 | 4/1990 | (EP) . |
| 0 633 053 A1 | 1/1995 | (EP) . |
| 0 642 922 A1 | 3/1995 | (EP) . |
| 0 743 089 A2 | 11/1996 | (EP) . |
| 08-318114 | 12/1996 | (JP) . |
| WO 84/03645 | 9/1984 | (WO) . |
| WO 90/06846 | 6/1990 | (WO) . |
| WO 91/08829 | 6/1991 | (WO) . |

OTHER PUBLICATIONS

Ishino et al., "PTFE Porous Membrane for Air Filter", Nitto Giho, vol. 34, No. 1 (May 1996), pp. 24–26 (with English translation).

*Primary Examiner*—Blaine Copenheaver
(74) *Attorney, Agent, or Firm*—Merchant & Gould P.C.

(57) ABSTRACT

A filter medium which has an average pore diameter of more than 0.5 $\mu$m, a pressure loss of 2–50 mmH$_2$O determined when air is permeated therethrough at a velocity of flow of 5.3 cm/sec, and a PF value of 18–12, which is calculated in accordance with the following equation on the basis of this pressure loss and a collection efficiency using DOP of a grain size of 0.10–0.12 $\mu$m.

$$PF \text{ value} = \frac{-\log(\text{permeability}(\%)/100)}{\text{Pressure Loss}} \times 100.$$

Permeability (%)=100 −Collection Efficiency (%).

14 Claims, 2 Drawing Sheets

FILTER MEDIUM AND AIR FILTER UNIT USING THE SAME

TECHNICAL FIELD

The present invention relates to a filter medium used for cleaning air in clean rooms, equipment for manufacturing liquid crystal or semiconductor, and the like, and to an air filter unit using the same.

TECHNICAL BACKGROUND

A high-performance air filter which has a folded filter medium made from glass fiber through a wet process provides clean air, and thus has contributed to the semiconductor industry. Also, high integration of LSI has been developed, and minimum pattern dimensions of a device have been reduced. Thus, the size of fine particles which should be removed has been decreasing. Accordingly, ULPA (Ultra Low Penetration Air) filters having greater performance than HEPA (High Efficiency Particulate Air) filters now are often used in clean rooms for semiconductor manufacture.

However, borosilicate glass fiber used in a filtration medium of a conventional ULPA filter is attacked by hydrofluoric acid, which is used in manufacturing semiconductor, and $BF_3$ gas is generated. The boron accumulates on a silicon wafer in the manufacturing process of semiconductor, thus causing abnormal characteristics. Thus, it has become an urgent matter to deal with this problem.

Recently, particular attention has been paid to a high-performance air filter using a filter medium made from polytetrafluoroethylene (hereinafter referred to as "PTFE") which does not generate boron (e.g. Japanese Publication of Unexamined Patent Application (Tokkai) No. HEI 5-202217, or WO94/16802).

Such an air filter made from PTFE is free of the problem of off-gassing of boron etc. because the PTFE used in the filter medium is very clean and has excellent chemical resistance. Furthermore, the air filter made from PTFE also can achieve the same or higher collection efficiency of floating fine particles as the above-mentioned ULPA filter made from glass fiber. Moreover, because the PTFE air filter displays a considerably lower pressure loss than the glass fiber filter when they have the same collection efficiency (for example, the pressure loss of a ULPA filter made from PTFE is two third that of a ULPA filter made from glass fiber), the energy cost for the operation of the filter can be reduced. Because of these characteristics, the use of an air filter made from PTFE is spreading rapidly into various industries such as the semiconductor industry.

However, the requirement for cost reduction is severe in many industries. Therefore, it is desired to further develop a PTFE filter medium that satisfies the conditions "further improved collection efficiency and a lower pressure loss to reduce the cost for the filter operation" at the same time and an air filter unit using such a filter medium (not limited to ULPA type, but also including HEPA type and a medium-performance type).

However, an increase in collection efficiency and a reduction in pressure loss contradict each other (see, for example, Nitto Giho, Vol. 34, No. 1 (May, 1996)). Thus, it is not easy to solve the above-mentioned problems, and a satisfactory product has not yet been obtained.

Also, as is described in the above-mentioned Japanese Publication of Unexamined Patent Application (Tokkai) No. HEI 5-202217 or WO94/16802, for example, it is considered that when a conventional PTFE filter medium is used as a high-performance air filter, the aim of the filter cannot be attained unless its average pore diameter is in the range of 0.2 to 0.5 μm. However, it is not easy to control the average pore diameter within this very small and narrow range at all times.

DISCLOSURE OF THE INVENTION

Accordingly, it is an object of the present invention to provide a filter medium that has both a collection efficiency capable of attaining air cleanness required for each of medium-performance, HEPA, and ULPA type filters, and a pressure loss capable of achieving reduction of energy cost, which has not been possible to achieve in any of the above-mentioned filter types, and that also enables easy control of the average pore diameter, and an air filter unit using the same.

In order to accomplish the above object, the present invention provides a filter medium comprising a PTFE porous membrane, in which an average pore diameter of the PTFE porous membrane is more than 0.5 μm, and a pressure loss when air is passed through the medium at 5.3 cm/sec is from 2 to 50 mmH$_2$O, and a PF value, which is calculated from the pressure loss and a collection efficiency using dioctylphthalate (hereinafter referred to as "DOP") of a particle size of 0.10 to 0.12 μm in accordance with the following equation, is between 18 and 22:

(Equation 1)

$$PF \text{ value} = \frac{-\log(\text{permeability}(\%)/100)}{\text{Pressure Loss}} \times 100$$

Permeability (%)=100−Collection Efficiency (%)

Thus, the filter medium of the present invention displays excellent performance in both collection efficiency and pressure loss and also enables easy control of an average pore diameter, by having an average pore diameter, a pressure loss, and a PF value within the above specified ranges. It is particularly of note that the average pore diameter of the filter medium of the present invention is larger than the range of the average pore diameter that has been considered as a common size (0.2 to 0.5 μm). That is, the average pore diameter is more than 0.5 μm, so that the average pore diameter of the filter medium of the present invention can be controlled easily.

Furthermore, the PF value is an indicator showing a balance between the collection efficiency and the pressure loss. According to the PF value, for example, among two or more filter media having equal collection efficiency, the larger the PF value, the smaller the pressure loss.

In the filter medium of the present invention, it is preferable that the PTFE porous membrane is formed from intertwining PTFE fibers, and the PTFE fibers have an average fiber diameter in the range of 0.1 to 0.2 μm. This is because, when the average diameter of the PTFE fibers is within this range, the PF value falls in the above specified range sufficiently at the above-mentioned average pore diameter and pressure loss.

It is preferable that the filter medium of the present invention displays a pressure loss from 2 to 45 mmH$_2$O when the average pore diameter of the PTFE porous membrane is from 0.58 to 5 μm and when air is passed through the medium at a flow velocity of 5.3 cm/sec.

It is preferable that the filter medium of the present invention displays a pressure loss from 2 to 45 mmH$_2$O when the average pore diameter of the PTFE porous membrane is from 1.1 to 3 μm and when air is passed through the medium at a flow velocity of 5.3 cm/sec.

It is preferable that the filter medium of the present invention has a collection efficiency of at least 40% using DOP of a particle size of 0.10 to 0.12 μm. A collection efficiency in this range becomes equal to or higher than the collection efficiency of a medium-performance filer unit when the filter medium is incorporated in a filter unit.

Generally, a medium-performance filter unit is used as a prefilter, which roughly removes dust from an atmosphere directly taken therein at the first place, and is required to have a collection efficiency of at least 90% for DOP of a particle size of 0.3 μm (in conversion, a collection efficiency of at least 60% for DOP of a particle size of 0.10 to 0.12 μm). Moreover, the collection efficiency of a filter unit is measured according to a method mentioned below. To obtain a collection performance of a filter unit equal to or higher than this range, the filter medium of the present invention should have a collection efficiency within the above-mentioned range.

It is preferable that the filter medium of the present invention has at least 99.0% for the collection efficiency using DOP of a particle size of 0.10 to 0.12 μm. A collection efficiency in this range becomes equal to or higher than the collection efficiency of a glass fiber HEPA filter unit when the filter medium is incorporated in a filter unit.

The glass fiber HEPA filter unit is attached, for example, to the ceiling of various clean rooms, or in an equipment for manufacturing liquid crystal or semiconductor, and is required to have a collection efficiency of at least 99.97% for DOP of a particle size of 0.3 μm (in conversion, a collection efficiency of at least 99.8% for DOP of a particle size of 0.10 to 0.12 μm). To obtain a collection performance of a filter unit equal to or higher than this range, the filter medium of the present invention should have a collection efficiency within the above-mentioned range.

It is preferable that the filter medium of the present invention has a collection efficiency of at least 99.99% using DOP of a particle size of 0.10 to 0.12 μm. A collection efficiency in this range becomes equal to or higher than the collection efficiency of a glass fiber ULPA filter unit when the filter medium is incorporated in a filter unit.

The glass fiber ULPA filter unit has a higher collection efficiency than the above-mentioned glass fiber HEPA filter unit, and particularly, it is required to have a collection efficiency of at least 99.9995% for DOP of a particle size of 0.10 to 0.12 μm. To obtain a collection performance that is equal to or higher than this range, the filter medium of the present invention should have a collection efficiency within the above-mentioned range.

In the filter medium of the present invention, it is preferable that an air-permeable support member is provided on at least one side of the PTFE porous membrane, so that the filter medium may have increased strength and improved handling quality.

The total amount of organic substances detected from the air-permeable support member at 80° C. is preferably not more than 1,000 ng, more preferably not more than 500 ng, most preferably not more than 150 ng per 250 mg of the air-permeable support member. Moreover, this lowest limit for the total amount of organic substances detected is the limit of detection, and preferably it is 0 ng per 250 mg of the air-permeable support member.

Thus, when the total amount of the organic substances detected from the air-permeable support member under a certain condition is set within the above specified range, product yield can be increased when using the air filter in a clean room in a field such as the semiconductor industry, precision electronics, or the like.

The total amount of organic substances generally is referred to as total organic carbon (TOC), which is the total quantity of various gaseous organic substances such as dodecane, tridecane, butylhydroxyethylene (BHT), phosphoric ester, dioctylphthalate, siloxane, and the like.

It is preferable that the air-permeable support member is substantially formed from at least one of polyamide and polyester, since little organic substances are generated from these materials.

It is herein understood that the above-mentioned "substantially formed from at least one of polyamide and polyester" means that the air-permeable support member comprises at least one of polyamide and polyester as a main component and contains no materials that cause generation of organic substances such as polyolefin etc., and also contains no component that is volatile in an atmosphere present during the operation of an air filter.

Accordingly, it is preferable that the air-permeable support member is substantially formed from polyester and contains no polyolefin. It is preferable to use at least one of polyethylene terephthalate (PET) and polybutylene terephthalate (PBT) as the polyester.

Moreover, in the present invention, the above-mentioned detection of organic substances from the air-permeable support member at 80° C. can be performed by a purge-and-trap method using gas chromatography. This method can be carried out, for example, according to the procedures as described below.

Next, an air filter unit of the present invention comprises a frame and the filter medium of the present invention folded in a corrugated form and housed in the frame, the gap between the frame and the filter medium being sealed. This air filter unit exhibits low pressure loss and high collection efficiency because it uses the high-performance filter medium of the present invention.

BEST MODES FOR CARRYING OUT THE INVENTION

Figure 1:
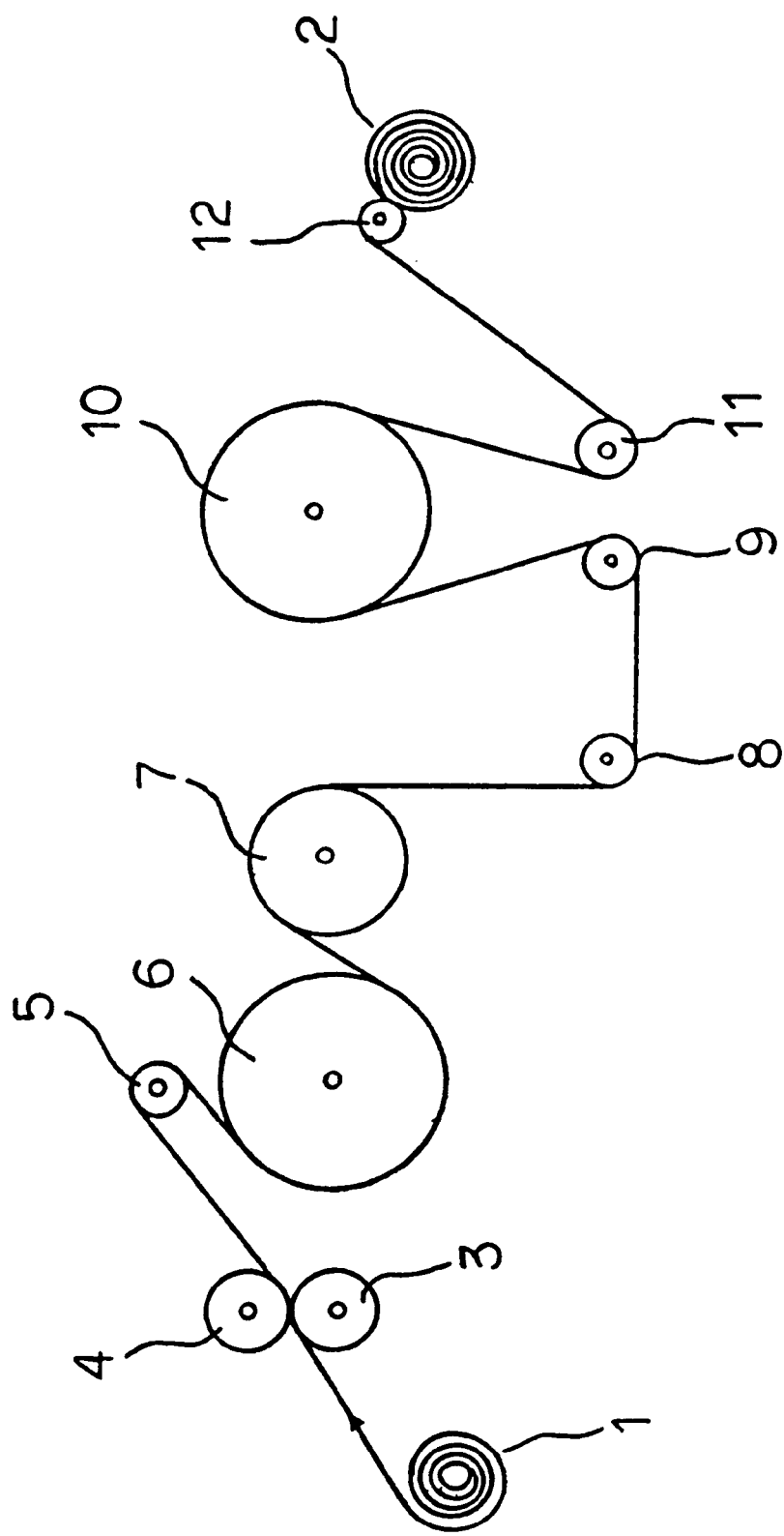
FIG. 1 is a schematic diagram showing one example of an apparatus for stretching in the longitudinal direction.

The present invention will be described in detail in the following.

The filter medium of the present invention can be produced, for example, as follows:

First, PTFE fine power is molded into a predetermined shape. The PTFE fine powder usually has a number average molecular weight of at least 500,000, preferably from 2,000,000 to 20,000,000. Furthermore, the PTFE fine powder can be molded, for example, by a known paste extrusion method In this molding, usually, 15 to 40 weight parts, preferably 20 to 30 weight parts, of a liquid lubricant is mixed with 100 weight parts of PTFE fine powder. Any known material conventionally used in paste extrusion may be used as the liquid lubricant. Furthermore, preliminary molding may be carried out before the paste extrusion. Generally, a molding of a predetermined shape is produced as follows: the mixture of the PTFE fine powder and the liquid lubricant is preliminarily molded, and then the mixed molding is subjected to an extrusion by a paste extruder or to rolling with calender rolls etc., or to extrusion followed by rolling. The shape of the molding is not particularly limited, and any shape may be used as long as the molding can be stretched after heating mentioned below. One preferable shape of the molding is a tape-like form.

Next, the unsintered molding obtained through the above-mentioned paste extrusion is heated at a temperature not lower than the melting point of sintered PTFE, preferably at a temperature between the melting point of sintered PTFE (about 327° C.) and the melting point of unsintered PTFE (about 347°C.), so that a semi-sintered PTFE molding may be produced with a sintering degree of less than 0.3. A preferable range of the sintering degree is from 0.1 to 0.29.

The sintering degree of the semi-sintered PTFE molding of the present invention is determined by the method disclosed in Japanese Publication of Unexamined Patent Application (Tokkai) No. HEI 5-202217, particularly the following method:

First, a sample of 3.0±0.1 mg is weighed and cut from the unsintered PTFE, and a crystal melting curve is determined with the sample. Similarly, a sample of 3.0±0.1 mg is weighed and cut from the semi-sintered PTFE, and a crystal melting curve is determined with the sample.

The crystal melting curve can be obtained with a differential scanning calorimeter (hereinafter referred to as "DSC"; for example, DSC-50, manufactured by Shimadzu Corporation). First, the sample of the unsintered PTFE is put into an aluminum pan of the DSC, and the heats of fusion of the unsintered PTFE and sintered PTFE are measured according to the following procedures:

(1) The sample is heated to 250° C. at a heating rate of 50 ° C./min, and then heated from 250° C. to 380° C. at a heating rate of 10° C./min. The position of the peak of the heat absorption curve that appears during this heating is defined as "the melting point of the unsintered PTFE" or "the melting point of the PTFE fine powder".

(2) Immediately after the sample is heated to 380° C., the sample is cooled down to 250° C. at a cooling rate of −10° C./min.

(3) The sample is again heated to 380° C. at a heating rate of 10° C./min. The position of the peak of the heat absorption curve that appears during this heating is defined as "the melting point of the sintered PTFE".

Then, a crystal melting curve of a semi-sintered PTFE is recorded according to the step (1) above. The heats of fusion of the unsintered PTFE, sintered PTFE, and semi-sintered PTFE are in proportion to the areas between the heat absorption curves and the base line, and can be calculated automatically by setting the temperatures for analysis in the above-mentioned DSC-50 manufactured by Shimadzu Corporation.

Also, the sintering degree of PTFE can be calculated according to the following equation:

(Equation 2)

Sintering Degree=$(\Delta H_1-\Delta H_3)/(\Delta H_1-\Delta H_2)$, wherein $\Delta H_1$ is the heat of fusion of the unsintered PTFE, $\Delta H_2$ is the heat of fusion of the sintered PTFE, and $\Delta H_3$ is the heat of fusion of the semi-sintered PTFE.

Moreover, with respect to the semi-sintered PTFE, there is a detailed description in Japanese Publication of Unexamined Patent Application (Tokkai) No. SHO 59-152825.

Next, the semi-sintered PTFE molding obtained by the above-mentioned heating having a specific sintering degree is stretched in biaxial directions (MD: longitudinal direction, TD: width direction) by a factor of at least 700, preferably from 700 to 1,500 by area. In this case, it is significant that the molding is stretched by a factor of at least 15, preferably from 15 to 30, in the MD direction (the longitudinal or extruding direction) and by a factor of at least 40, preferably from 40 to 60, in the TD direction (the direction vertical to the longitudinal direction, or the width direction). That is, by stretching the semi-sintered PTFE molding having a particular low sintering degree by a relatively high factor in the MD direction and by a considerably high factor in the TD direction, and moreover, finally by an exceptionally high factor in total by area, a PTFE porous membrane having predetermined properties of the present invention can be obtained.

The above-mentioned stretching of a film in the MD direction can be carried out, for example, by the stretching apparatus shown in FIG. 1. In this apparatus, a semi-sintered PTFE film is sent from a film-feeding roll 1 through rolls 3, 4 and 5 to rolls 6 and 7, where the film is stretched by the above specified factor in the MD direction. The principle of this stretching is that the winding speeds of the rolls 6 and 7 are larger than the film-feed speed of the roll 1. The stretched film is then sent to rolls 8 and 9, a heat-setting roll 10, a cooling roll 11, and a roll 12 in this order, and finally wound-up by a takeup roll 2. Furthermore, it is preferable that the stretching in the MD direction is performed at a temperature not higher than the melting point of the sintered PTFE.

Figure 2:
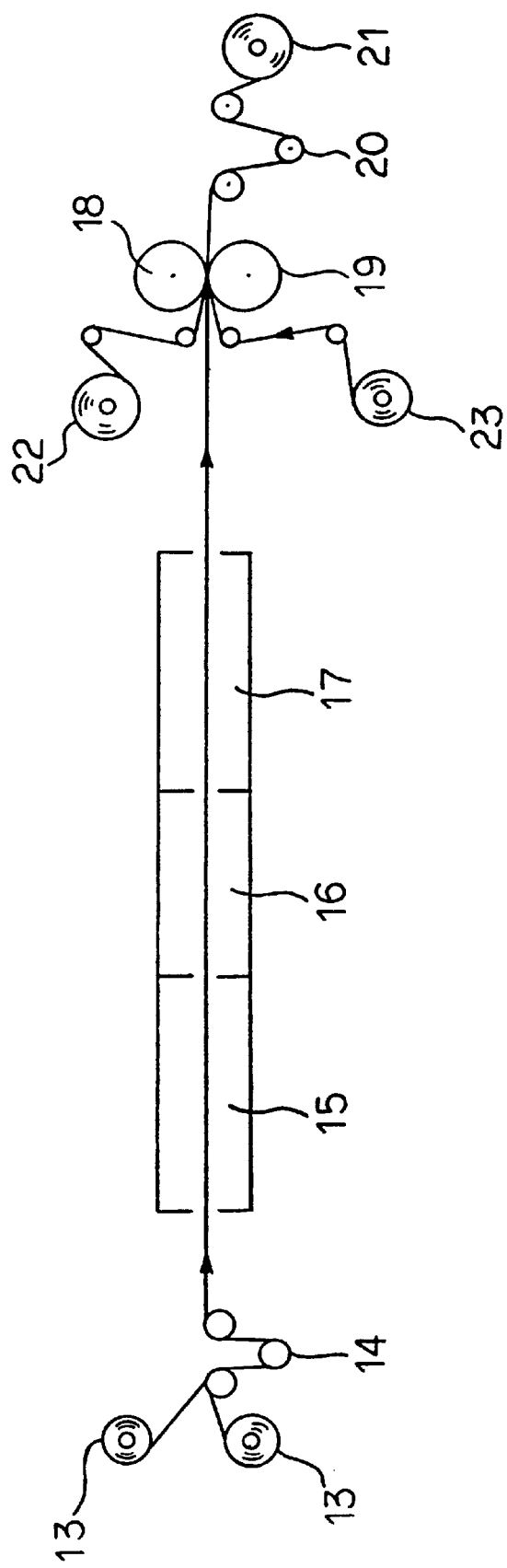
FIG. 2 is a schematic diagram showing one example of an apparatus for stretching in the lateral direction.

The above-mentioned stretching in the TD direction can be carried out using, for example, the stretching apparatus shown in FIG. 2. This apparatus can continuously grip a film stretched in the longitudinal direction (MD direction) with clips at its both ends in the width direction. That is, in this apparatus, a semi-sintered PTFE film (stretched in the MD direction) is sent from a film-feeding drum 13 through a film-feeding control roll 14, and then is passed through a preheating oven 15, an oven 16 for stretching in the width direction, and a heat-setting oven 17 in this order. While the film passes through these ovens, stretching in the width direction and heat-setting are carried out. Then, the film stretched in the width direction is sent to laminating rolls 18 and 19, where it is laminated with an air-permeable support member, such as a nonwoven or the like, which is sent from rolls 22 and 23 as needed. Then, the laminate film is wound up by a takeup drum 21 through a takeup control roll 20. Moreover, the apparatus shown in the drawing has two film-feeding drums 13, so that a laminate of two or more PTFE films may be subjected to the stretching as needed. The stretching in the TD direction usually can be performed in an atmosphere at 200 to 420° C.

The stretched PTFE porous membrane may be heat set at a temperature of the melting point of the unsintered PTFE (about 347° C.) or higher.

In the stretched PTFE porous membrane thus obtained, PTFE fibers are intertwined and connected with one another and form a porous construction. Moreover, the stretched PTFE porous membrane is constructed substantially only from fibers having no nodes. Moreover, the stretched PTFE porous membrane has an average pore diameter more than 0.5 μm, and has a pressure loss of 2 to 50 mmH$_2$O when air is passed through the medium at a flow velocity of 5.3 cm/sec. Furthermore, the PF value calculated from this pressure loss and a collection efficiency using DOP of a particle size of 0.10 to 0.12 μm is between 18 and 22.

It is preferable that the average pore diameter is larger than 0.5 μm but not more than 15 μm; more preferably at least one range from larger than 0.5 μm but not more than 5 μm, larger than 0.51 μm but not more than 5 μm, and from 0.58 μm to 5 μm; and particularly preferably from 1.1 to 3 μm.

It is preferable that the pressure loss is from 2 to 50 mmH$_2$O, more preferably from 2 to 48 mmH$_2$O, particularly preferably from 2 to 45 mmH$_2$O.

When it is desired to obtain a filter medium of high performance (HEPA or ULPA type), the filter medium of the present invention may be prepared by laminating several layers of the PTFE porous membrane having a relatively low pressure loss obtained by the above-mentioned method as appropriate. That is, for example, when two PTFE porous membranes having an average pore diameter, pressure loss, and PF value in the above specified ranges of the present invention are laminated, the pressure loss is approximately doubled at the same average pore diameter, but the collection efficiency becomes greater than a single layer. Therefore, if this double-layered filter medium satisfies the above specified ranges of the pressure loss for each type of the filter units, collection efficiency can be increased.

Next, the PF value will be explained below. The collection efficiencies of floating fine particles in the air required for each type of filter medium have been roughly described previously. When noting only the collection efficiency, as is mentioned above in the description about the prior art of this invention, the collection efficiencies required for the respective filter units have been already achieved by conventional technologies.

However, on the other hand, it also has been required to reduce energy cost at the operation of an air filter unit using these filter media. To achieve this, a further reduction in pressure loss is necessary. In other words, a filter medium is truly required to satisfy a further increase in collection efficiency and a further decrease in pressure loss at the same time depending on the aim and place of its use. Such a performance can be expressed by the PF value of the present invention, which is a numerical value determined from the balance between the collection efficiency and pressure loss.

While the PF values of the filter media of the glass fiber medium-performance type, glass fiber HEPA type, and glass fiber ULPA type, which are on the market, are as low as about 10, the PF value of the filter medium of the present invention is as high as between 18 and 22. Furthermore, it is preferable that the PF value of the filter medium of the present invention is at least one selected from ranges between 18.5 and 22, between 19 and 22, between 19.5 and 22, between 20 and 22, between 20.5 and 22, and between 21 and 22.

The PF value is a given value when PTFE porous membranes of filter media have the same structure. In addition, the filter medium of the present invention has a PF value equal to or higher than a conventional PTFE filter medium with an average pore diameter of 0.2 to 0.5 μm. Therefore, the structure of the filter medium of the present invention is different from conventional structures. Comparing the filter medium of the present invention with conventional filter media in this point, there are differences in that the filter medium of the present invention has a large average pore diameter (more than 0.5 mm), and in addition, a small average diameter of the PTFE fibers.

In the filter medium of the present invention, the average diameter of the PTFE fibers is usually from 0.1 to 0.2 μm, preferably from 0.1 to 0.16 μm, more preferably more than 0.1 μm but less than 0.14 μm, most preferably from 0.101 to 0.139 μm.

Furthermore, in the filter medium of the present invention, the thickness of the PTFE porous membrane is usually from 0.1 to 30 μm, preferably from 0.1 to 20 μm, more preferably from 0.5 μm to 15 μm.

In the filter medium of the present invention, the above PTFE porous membrane may be used by itself, but a composite membrane prepared by laminating the PTFE porous membrane with other air-permeable support members having a low pressure loss also may be used, as long as the properties of the PTFE porous membrane are not damaged. Such a laminate PTFE porous membrane has increased strength and better handling quality. Moreover, the laminate PTFE porous membrane may, for example, be folded in a pleated fashion, and is used as a filter medium for collecting floating fine particles.

The overall thickness of the filter medium of the present invention is usually from 50 to 1,000 μm, preferably from 100 to 700 μm, particularly preferably from 100 to 500 μm.

As the air-permeable support member, a nonwoven, woven, mesh, and other porous membranes may be used. Examples of the material of the air-permeable support member include olefin (e.g. polyethylene, polypropylene, and the like), nylon, polyester, aramid, a composite thereof (e.g. a nonwoven comprising core/sheath structure fibers, a double-layered nonwoven comprising a low melting material layer and a high melting material layer, or the like), and a fluorine-based porous membrane [e.g. a PFA (tetrafluoroethylene/perfluoroalkylvinylether copolymer) porous membrane, FEP (tetrafluoroethylene/hexafluoropropylene copolymer) porous membrane, PTFE porous membrane, or the like].

Among these air-permeable support members, it is preferable to use a nonwoven comprising core/sheath fibers, double-layered nonwoven comprising a low melting material layer and a high melting material layer, or the like, since such members do not shrink when laminated. Moreover, laminates of such an air-permeable support member and the PTFE porous membrane have an advantage in that they are easily processed as a filter medium of HEPA or ULPA type.

The laminate may be prepared by laminating the PTFE porous membrane of the present invention on either one or both sides of the air-permeable support member, or by sandwiching the PTFE porous membrane of the present invention between two air-permeable support members.

Particularly, the laminate prepared by sandwiching the PTFE porous membrane of the present invention between two air-permeable support members is preferable.

The method of lamination may be selected from conventional methods as appropriate. Examples include methods of thermal pressure bonding carried out by melting a portion of the air-permeable support member, by using powder of polyethylene, polyester, PFA, or the like as an adhesive, or by using a hot melt resin. In the integration by such a bonding, it is particularly preferable to use a polyester-based hot melt adhesive, because generation of organic substances can be kept at a reduced level.

As mentioned above, it is preferable to use a material from which is detected a total amount of organic substances not exceeding the above specified value under a predetermined condition as the air-permeable support member. Also, as an air-permeable support member from which is detected a total amount of organic substances not exceeding the above specified value, it is preferable to use a material comprising at least one of polyester and polyamide, particularly preferably a material comprising polyester but not containing polyolefin.

Examples of the air-permeable support member substantially comprising at least one of polyester and polyamide include a nonwoven, woven fabric, mesh, porous membrane, and the like, preferably a nonwoven. Examples of such a nonwoven include the following nonwovens using filaments and those using staple fibers based on the method of its production:

(1) Filament: spun-bonded nonwoven, melt-blown nonwoven, and flash-spun nonwoven;
(2) Staple Fiber: thermal-bonded nonwoven, nonwoven produced by wet process, needle-punched nonwoven, stitch-bonded nonwoven, and nonwoven produced by water jet.

Among these examples, it is preferable to use a spun-bonded nonwoven comprising filaments as the air-permeable support member, since TOC is reduced. Moreover, in the above-mentioned nonwoven comprising PET fiber produced by wet process, because it is necessary to add an additive such as oil in the process, the oil or the like may leave the material itself and cause generation of impurities (such as TOC). Therefore, it is not desirable to use this as it is prepared on the market, and it is preferable to use it after removing the oil or the like.

Examples of the structure of the above-mentioned nonwoven include one using single fiber, one using blended fiber, one using core/sheath fiber, a laminate, and the like. Among these examples, the nonwoven using single fiber has an advantage of low cost, and the nonwoven using core/sheath fiber has advantages in that it is hard to shrink and easy to process. Thus, these types of nonwoven are respectively preferable.

It is preferable that the above-mentioned nonwoven has a basis weight of 10 to 600 g/m$^2$, preferably from 15 to 300 g/m$^2$, more preferably from 15 to 100 g/m$^2$. If the basis weight exceeds 100 g/m$^2$, processing of a filter medium, for example, into a pleated air filter, becomes difficult (for example, it is hard to fold), and also cost is likely to rise.

Examples of the polyamide include nylon-6, nylon-6,6, and the like.

Examples of the polyester include PET, PBT, polyethylene-2,6, naphthalate, and the like, preferably having a melting point of at least 120° C. As a material of polyester, a nonwoven comprising polyester fibers is preferably used. The melting point of a material comprising only one type of polyester (having one melting point) is at least 120° C., preferably at least 180° C. In a material comprising a combination of two or more types of polyesters such as a blended material or of core/sheath structure (having at least two melting points), the high melting point is usually between 240° C. and 280° C., and the low melting point is at least 120° C., preferably at least 180° C. That is, if the melting point is lower than 120° C., a high TOC results, thus it is not preferable.

Examples of the type of the nonwoven comprising polyester fibers include one comprising PET fibers, one comprising PBT fibers, one comprising core/sheath fibers having a PET core component and a PBT sheath component (nonwoven comprising core/sheath fibers of PET/PBT), one having a high melting PET core component and a low melting PET sheath component (nonwoven comprising core/sheath fibers of high melting PET/low melting PET), one comprising conjugated fibers of PET and PBT fibers, one comprising conjugated fibers of high melting PET and low melting PET fibers, and the like.

Furthermore, a preferable example of the low melting PET is a copolymerized polyethylene terephthalate prepared by copolymerizing isophthalic acid, adipic acid, diethylene glycol, polyethylene glycol, and the like. Also, a preferable example of the high melting PET and simple PET is a PET substantially comprising a terephthalic acid component and an ethylene glycol component and having a melting point of about 260° C.

The PBT also may be a copolymer with other copolymerizable components.

In a filter medium comprising a PBT nonwoven and a PTFE porous membrane in contact with the PBT nonwoven, for example, one using the above-mentioned nonwoven comprising core/sheath fibers of PET/PBT, it is preferable that both components are integrated, for example, by thermal melt bonding with a heat roll (lamination). That is, PBT is easier to be melt bonded to the PTFE porous membrane than other polyester resins. Thus, integration of the components can be carried out continuously by using, for example, thermal melt bonding with a heat roll, so that the efficiency of producing the filter medium can be improved.

When the integration is carried out by a thermal melt bonding in which a portion of the air-permeable support member is melted, for example, the following embodiments may be used:

(1) (nonwoven comprising low melting PET fiber):(PTFE porous membrane):(nonwoven comprising low melting PET fiber):(nonwoven comprising high melting PET fiber)
(2) (nonwoven comprising low melting PET fiber):(PTFE porous membrane):(nonwoven comprising core/sheath fibers of high melting PET/low melting PET)
(3) (nonwoven comprising core/sheath fibers of high melting PET/low melting PET):(PTFE porous membrane):(nonwoven comprising core/sheath fibers of high melting PET/low melting PET)
(4) An embodiment of (3), in which the (nonwoven comprising core/sheath fibers of high melting PET/low melting PET) is replaced by a (nonwoven comprising a mixed fiber of high melting PET fiber and low melting PET fiber).
(5) (nonwoven comprising corelsheath fibers of PET/PBT):(PTFE porous membrane):(nonwoven comprising core/sheath fibers of PET/PBT)
(6) (nonwoven comprising core/sheath fibers of PET/PBT):(PTFE porous membrane):(nonwoven comprising low melting PET fiber)
(7) (nonwoven comprising core/sheath fibers of PET/PBT):(PTFE porous membrane):(nonwoven comprising core/sheath fibers of high melting PET/low melting PET)
(8) (nonwoven comprising low melting PET fiber):(PTFE porous membrane):(nonwoven comprising a mixed fiber of high melting PET fiber and low melting PET fiber)
(9) (nonwoven comprising a mixed fiber of high melting PET fiber and low melting PET fiber):(PTFE porous membrane):(nonwoven comprising low melting PET fiber):(nonwoven comprising high melting PET fiber)
(10) (nonwoven comprising a mixed fiber of high melting PET fiber and low melting PET fiber):(PTFE porous membrane):(nonwoven comprising core/sheath fibers of PET/PBT)
(11) (nonwoven comprising core/sheath fibers of PET/PBT):(PTFE porous membrane):(nonwoven comprising low melting PET fiber):(nonwoven comprising high melting PET fiber)
(12) (nonwoven comprising PBT fiber):(PTFE porous membrane):(nonwoven comprising PBT fiber)
(13) (nonwoven comprising PBT fiber):(PTFE porous membrane):(nonwoven comprising low melting PET fiber)

(14) (nonwoven comprising PBT fiber):(PTFE porous membrane):(nonwoven comprising low melting PET fiber):(nonwoven comprising high melting PET fiber)

(15) (nonwoven comprising PBT fiber):(PTFE porous membrane):(nonwoven comprising core/sheath fibers of high melting PET fiber/low melting PET fiber)

(16) (nonwoven comprising PBT fiber):(PTFE porous membrane): (nonwoven comprising a mixed fiber of high melting PET fiber and low melting PET fiber)

(17) (nonwoven comprising PBT fiber):(PTFE porous membrane): (nonwoven comprising core/sheath fibers of PET/PBT)

(18) (nonwoven comprising low melting PET fiber): (PTFE porous membrane):(nonwoven comprising low melting PET fiber)

(19) (nonwoven comprising high melting PET fiber): (PTFE porous membrane):(nonwoven comprising high melting PET fiber)

The melt bonding with a heat roll in the above-mentioned lamination can be carried out by a pinch roll method or by a method without directly applying pressure in the thickness direction of the laminate (for example, without pinching) as disclosed in Japanese Publication of Unexamined Patent Application (Tokkai) No. HEI 6-218899. The surface of the heat roll may be either a mirror-finished surface or an embossing surface. The roll temperature may be, for example, a temperature of at least the softening point of the low melting PET or PBT but not exceeding the melting point of the high melting PET.

In an embodiment using a hot melt adhesive for the bonding, as the polyester fiber materials preferably used are nonwovens made of PET, for example, nonwovens comprising a high melting PET fiber, low melting PET fiber, mixed fiber comprising high melting PET fiber and low melting PET fiber, or core/sheath fiber of high melting PET/low melting PET.

Any known method may be used in the above-mentioned bonding using an adhesive, but it is preferable to employ spray application, spiral spray application, slot spray application, melt blown application, print wheel application, ribbon lip application, or the like, so that the amount of flow through the air-permeable support member may not be reduced. It is preferable to use a hot melt adhesive capable of reducing generated organic substances and at the same time has an advantage of low cost as the adhesive.

Next, preferable embodiments of the filter medium of the present invention for the respective types are as follows:

(1) Medium-Performance type:
Collection Efficiency: at least 40% for DOP of a particle size of 0.10 to 0.12 μm;
PF value: between 18 and 22

(2) HEPA type:
Collection Efficiency: at least 99.0% for DOP of a particle size of 0.10 to 0.12 μm;
PF value: between 18 and 22

(3) ULPA type:
Collection efficiency: at least 99.99% for DOP of a particle size of 0.10 to 0.12 μm;
PF value: between 18 and 22

The filter medium of the present invention can be used as a substitute of the filter media used in various types of air filter unit, particularly, as a substitute of the filter medium of a medium-performance air filter, glass fiber HEPA filter, or glass fiber ULPA filter. Among these, it is preferable to use the filter medium of the present invention as a substitute of the filter medium of a glass fiber HEPA filter or glass fiber ULPA filter, which can fully display the high collection efficiency of the filter medium of the present invention.

Furthermore, the filter medium of the present invention can be used not only as a filter medium of an air filter unit, but also as a partition of a clean humidifier. Moreover, it may also be used as a breather filter or recirculation filter of a hard disc drive, or for other water-proof air-permeable materials.

Next, the air filter unit of the present invention is produced by folding the filter medium of the present invention in a corrugated form and housing it in a frame, and sealing the gap between the frame and the filter medium. The sealing can be performed by a conventional method.

The configuration of the air filter unit of the present invention is not particularly limited, and it may be, for example, a separator type or minipleats type. Moreover, in the air filter unit of the present invention, it is preferable to use the filter media that have been described above as preferable embodiments of the present invention.

The air filter unit of the present invention can be used in medicine, food industry, biotechnology, liquid crystal industry, clean rooms for the semiconductor industry etc., diffusion furnace, coater developer, wet station, chemical vapor deposition (CVD), stepper, stocker, dry etching equipment, plasma etching equipment, clean booth, clean chamber, wafer inspection equipment (surface scan, prober), semiconductor manufacturing equipment such as FFU or CMP. Furthermore, the air filter unit of the present invention may also be used in combination with various chemical filters.

Next, examples of the present invention are described below. In the following examples, average pore diameter, pressure loss, permeability, collection efficiency and film thickness of a filter medium, average diameter of PTFE fiber, pressure loss and collection efficiency of an air filter unit, and total amount of organic substances generated from an air-permeable support member were measured by the following methods respectively.

(1) Average Pore Diameter of a Filter Medium

A mean flow pore size (MFP) measured under the conditions of ASTM F-316-86 was determined as an average pore diameter. Actual measurement was performed by Coulter Porometer (manufactured by Coulter Electronics (Great Britain)).

(2) Pressure Loss in a Filter Medium

A circular piece of a filter medium with a diameter of 47 mm was cut out as a sample to be measured, and was set in a filter holder having a permeation effective area of 12.6 cm². A pressure of 0.4 kg/cm² was applied to the inlet side, and the quantity of the air flowing out of the outlet side was controlled by an air flow meter (manufactured by Ueshima Seisakusho, Co., Ltd.; hereinafter the same) to a flow velocity of 5.3 cm/sec. The pressure loss at this time was measured by a manometer.

(3) Permeability of a Filter Medium

A sample to be measured was set in a filter holder with a diameter of 100 mm, and a pressure was applied to the inlet side by a compressor. The amount of the air flowing through was controlled to 5.3 cm/sec by an air flow meter. Under this condition, polydispersed DOP were caused to flow at a concentration of $10^7$/300 ml from upstream, and the number of permeated dust particles with a diameter of 0.10 to 0.12 μm was determined by a particle counter (PMS LAS-X-CRT manufactured by PARTICLE MEASURING SYSTEM INC. (PMS), hereinafter the same) provided at downstream. Permeability (%) of particles was determined from the ratio of the number. Moreover, for a sample having a high collection efficiency, the time of the measurement was extended so as to increase the amount of particles absorbed when the permeability was determined.

(4) Collection Efficiency of a Filter Medium

The collection efficiency of a filter medium was determined according to the following equation:

(Equation 3)

Collection Efficiency (%)=100−Permeability (%).

Moreover, for a PTFE porous membrane provided with an air-permeable support member, the above items (1) to (4) were measured in the condition being provided with the air-permeable support member, and the measured values were considered as the values of the PTFE porous membrane.

(5) Film Thickness of a Filter Medium (PTFE porous membrane)

Using a film-thickness Gage (1D-110MH, manufactured by Mitutoyo Corp.), total thickness of 10 laminated membranes was measured, and the average value thereof was determined as the thickness of one membrane.

(6) Average Diameter of PTFE Fibers

An enlarged photograph of 7,000 magnification was taken by a scanning electron microscope (S-4000, manufactured by Hitachi, Ltd.) for a PTFE porous membrane. The photograph was expanded to a quarter size, and four straight lines of the same length were drawn with 5 cm spacing both in the longitudinal and lateral directions on the photograph. Then, the diameters of the PTFE fibers located on the straight lines (about 500 fibers) were measured, and the average value thereof was determined as the average diameter of the PTFE fibers.

(7) Pressure Loss of a Filter Unit

Using an apparatus in accordance with the Q107 type DOP tester for HOT DOP method of MIL-STD-282, differential pressure was measured by an inclined manometer when a flow velocity of a filter unit was set to 0.5 m/sec.

(8) Collection Efficiency of a Filter Unit

Using an apparatus in accordance with the Q107 type DOP tester for HOT DOP method of MIL-STD-282, a flow velocity of a filter unit was set to 0.5 m/sec, and under this condition, HOT DOP of a particle size of 0.1 to 0.12 $\mu$m with a concentration of $1 \times 10^9/ft^3$ was caused to flow from upstream, while the number of the particles having a diameter of 0.1 to 0.12 $\mu$m was determined downstream by a particle counter. The permeability (%) of the particles was determined from the ratio of the number, and by using this value, collection efficiency was determined according to the above Equation 3.

(9) Total Amount of Organic Substances Generated from an Air-Permeable Support Member This measurement was carried out according to a purge-and-trap method using gas chromatography as follows: First, an air-permeable support member was cut into an exact 6 cm square piece with scissors, whose edges of the blades were washed with acetone sufficiently. Then, the piece was further cut into 5 mm square pieces. The sample thus obtained was put into a sample tube, which had been heated and maintained at 80° C. in advance, and washed by causing pure helium gas to flow at an air velocity of 50 ml/min at 80° C. for 60 minutes. (This temperature condition was set because the upper limit of the temperature for using an air filter unit is generally at 80° C.) Then, air was caused to flow under the same conditions for 15 minutes, and volatile or gaseous components which were generated from the sample were purged from the sample tube and introduced in a trap tube. In this trap tube, the volatile components or the like were accumulated and condensed on an adsorbent (quartz wool) cooled to −40° C. Then, the adsorbent was heated instantaneously to 314° C., and the substances adsorbed to the adsorbent were discharged as gases for 20 minutes. Then, the discharged gases were used for gas chromatography, and their amount was measured and determined as the total amount of organic substances. The conditions of the measurement were as follows:

Gas Chromatography; GC14A, manufactured by Shimadzu Corporation

Column; FRONTIER LAB Ultra ALLOY Capillary Column, UA-5

Column Temperature; 50° C.→250° C. (10 minutes), with an increase rate of 10° C./min.

Split Ratio; 1:50 (column flow rate of 10 ml/min)

EXAMPLE 1

Twenty-five weight parts of a hydrocarbon oil (ISOPER, produced by Esso Sekiyu K.K) were mixed with 100 weight parts of PTFE fine powder with a number average molecular weight of 6,200,000 (POLYFLON FINE POWDER F104U, produced by Daikin Industries, Ltd.). The hydrocarbon oil was a liquid lubricant and was used as an extrusion assistant. The mixture was molded into a round bar with a mold of paste extrusion. The round bar molding was further molded into a film with calender rolls heated at 70° C., so that a PTFE film was obtained. The film was passed through a hot-air drying oven at 250° C. to dry and remove the extrusion assistant, so that a unsintered PTFE film with an average thickness of 100 $\mu$m and an average width of 150 mm was obtained. Then, the unsintered PTFE film was heated in an oven at 338° C. for 23 seconds, and a continuous semi-sintered PTFE film with a sintering degree of 0.20 was obtained.

Next, the semi-sintered PTFE film was stretched 20-fold in the longitudinal direction by the apparatus shown in FIG. 1. The stretched film was wound up by the takeup roll 2. Moreover, the conditions for the stretching in the longitudinal direction were as follows:

Conditions for Stretching

Rolls 3 and 4: Feed Speed, 0.5 m/min

Roll 6: Peripheral Speed, 4 m/min; Roll Temperature, 300° C.

Roll 7: Peripheral Speed, 10 m/min; Roll Temperature, 300° C.

Roll 10: Peripheral Speed, 10 m/min; Roll Temperature, room temperature

Roll 2: Takeup Speed, 10 m/min;

Space between the Rolls 6 and 7: 5 mm

Next, two layers of the film stretched in the longitudinal direction thus obtained were laminated, and the laminate was stretched 50-fold in the width direction by the apparatus shown in FIG. 2, which can continuously grip the laminate with clips. The conditions for the stretching in the width direction and heat setting were as follows:

Conditions for Treatment

Film-Running Speed: 10 m/min
Temperature of Preheating Oven: 300° C.
Temperature of Stretching Oven: 360° C.
Temperature of Heat-Setting Oven: 350° C.

The properties of the thus obtained filter medium (PTFE porous membrane) measured by the above-mentioned methods are shown in the Table 1 below.

TABLE 1

| Film Thickness ($\mu$m) | Average Pore Diameter ($\mu$m) | Pressure Loss (mmH$_2$O) | Collection Efficiency (%) | PF value | Average Diameter of PTFE fibers ($\mu$m) |
|---|---|---|---|---|---|
| 3.3 | 1.3 | 14.8 | 99.92 | 20.9 | 0.121 |

As is clear from the above Table 1, although the PTFE porous membrane of this Example had a large average pore diameter, it exhibited low pressure loss and high collection efficiency, and a PF value within the intended range.

EXAMPLE 2

Two layers of the PTFE porous membrane produced in Example 1 were laminated, and a thermal bonding nonwoven made of polyethylene/polyester (Product Name: ELEVES (Registered Trademark), produced by UNITIKA, LTD.) was thermally melt bonded to the upper and lower sides of the laminate, and thus a filter medium was obtained. The properties of the obtained filter medium were measured by the above-mentioned methods, and are shown in Table 2 below.

TABLE 2

| Film Thickness ($\mu$m) | Average Pore Diameter ($\mu$m) | Pressure Loss (mmH$_2$O) | Collection Efficiency (%) | PF value | Average Diameter of PTFE fibers ($\mu$m) |
|---|---|---|---|---|---|
| — | 1.3 | 29.7 | 99.99993 | 20.7 | 0.121 |

As is clear from the above Table 2, because the filter medium of this Example was prepared by laminating two PTFE porous membranes of the Example 1, the pressure loss was about two times that of Example 1. However, it was still small enough compared with a conventional one, and the collection efficiency was more improved than that of Example 1, and PF value was also within the intended range. Moreover, because the filter medium of this Example was provided with a nonwoven as the air-permeable support member, it had a high strength and excellent handling quality.

Moreover, the total amount of organic substances in the air-permeable support member "ELEVES" was 1215 ng per 250 mg of the air-permeable support member.

EXAMPLE 3

Twenty-five weight parts of a hydrocarbon oil (ISOPER, produced by Esso Sekiyu K.K.) were mixed with 100 weight parts of PTFE fine powder with a number average molecular weight of 6,200,000 (POLYFLON FINE POWDER F104U, produced by Daikin Industries, Ltd.). The hydrocarbon oil was a liquid lubricant and was used as an extrusion assistant. The mixture was molded into a round bar with a mold of paste extrusion. The round bar molding was further molded into a film with calender rolls heated at 70° C., so that a PTFE film was obtained. The film was passed through a hot-air drying oven at 250° C. to dry and remove the extrusion assistant, so that a unsintered PTFE film with an average thickness of 200 $\mu$m and an average width of 150 mm was obtained. Then, the unsintered PTFE film was heated in an oven at 338° C. for 18 seconds, and a continuous semi-sintered PTFE film with a sintering degree of 0.15 was obtained.

Next, the semi-sintered PTFE film was stretched 30-fold in the longitudinal direction by the apparatus shown in FIG. 1. The stretched film was wound up by the takeup roll 2. The conditions for the stretching in the longitudinal direction were as follows:

Conditions for Stretching

Rolls 3 and 4: Feed Speed, 0.33 m/min
Roll 6: Peripheral Speed, 4 m/min; Roll Temperature, 300° C.
Roll 7: Peripheral Speed, 10 m/min; Roll Temperature, 300° C.
Roll 10: Peripheral Speed, 10 m/min; Roll Temperature, room temperature
Roll 2: Takeup Speed, 10 m/min;
Space between the Rolls 6 and 7: 5 mm Next, the film stretched in the longitudinal direction thus obtained was stretched 40-fold in the width direction by the apparatus shown in FIG. 2, which can continuously grip the film with clips. The conditions for the stretching in the width direction and heat setting were as follows:

Conditions for Treatment

Film-Running Speed: 10 m/min
Temperature of Preheating Oven: 300° C.
Temperature of Stretching Oven: 340° C.
Temperature of Heat-Setting Oven: 340° C.

The pressure loss in the thus obtained PTFE porous membrane was measured according to the above-mentioned method, and the result was 7.1 mmH$_2$O.

Next, three layers of this PTFE porous membrane were laminated, and a thermal bonding nonwoven (the same product as in Example 2) was thermally melt bonded to the upper and lower sides of the laminate, and thus a filter medium was obtained. The properties of the obtained filter medium were measured by the above-mentioned methods, and are shown in Table 3 below.

TABLE 3

| Film Thickness ($\mu$m) | Average Pore Diameter ($\mu$m) | Pressure Loss (mmH$_2$O) | Collection Efficiency (%) | PF value | Average Diameter of PTFE fibers ($\mu$m) |
|---|---|---|---|---|---|
| — | 7.2 | 21.5 | 99.998 | 21.8 | 0.112 |

As is clear from the above Table 3, the filter medium of this Example had an average pore diameter that is considerably larger than those of Examples 1 and 2. Furthermore, although it was a laminate of three PTFE porous membranes, it exhibited a low pressure loss approximately equal to that of Example 1. In addition, it had a collection efficiency higher than that of Example 1, and a PF value within the intended range. Moreover, because the filter medium of this Example was provided with a nonwoven as an air-permeable support member, it had a high strength and excellent handling quality.

EXAMPLE 4

An air filter unit with outside dimensions of height of 610 mm, width of 610 mm, and depth of 65 mm was prepared by folding each of the filter media of Examples 1 to 3 in a corrugated form and incorporating it inside a frame (made of aluminum). In the cases of using the filter media of Examples 1 and 2, a thermal bonding nonwoven (the same as in Example 2) was thermally melt bonded to the upper and lower sides of the PTFE porous membrane, and the laminate was folded in a corrugated form and incorporated in the frame. The gap between the frame and the filter medium was sealed with urethane. The filter media incorporated in the three types of filter unit thus obtained had an area of 11.8 m$^2$.

The pressure loss and the collection efficiency of the obtained filter unit were measured by the above-mentioned methods. The results are shown in Table 4 below.

TABLE 4

| | Pressure Loss (mmH$_2$O) | Collection Efficiency (%) |
| --- | --- | --- |
| Unit of Example 1 | 5.0 | 99.995 |
| Unit of Example 2 | 9.8 | 99.999998 |
| Unit of Example 3 | 7.2 | 99.99997000 |

As is clear from the above Table 4, all of the filter units exhibited low pressure loss and high collection efficiency.

EXAMPLES 5 to 10

In the following Examples 5 to 10, the same PTFE porous membrane as in Example 1 was used. Also, as shown below, a filter medium was produced using air-permeable support members A to E. Moreover, when total amount of organic substances generated from the PTFE porous membrane was measured according to the above-mentioned method, no organic substances were detected.

EXAMPLE 5

Two layers of a PET filament nonwoven (produced by Toyobo Co., Ltd.; product name, ECULE 6602B; fineness, 2 denier; basis weight 60 g/m$^2$; melting point 265° C.) were used as air-permeable support members A. Onto one surface of each of these layers, a polyester-based hot melt adhesive (Diabond DH598B produced by Nogawa Chemical Co., Ltd.) was applied at a rate of 6 g/m$^2$. Then, the PTFE porous membrane was sandwiched between these two air-permeable support members A, then the laminate was contacted with a heat roll at a line speed of 10 m/min at 180° C. and integrated by heat melt bonding. Thus, a filter medium that exhibits a pressure loss of 15.0 mmH$_2$O, collection efficiency of 99.94%, and a PF value of 21.5 was obtained.

EXAMPLE 6

Two layers of a flame resistant PET filament nonwoven (produced by Toyobo Co., Ltd.; product name, HEIM H6301B; fineness, 2 denier; basis weight 30 g/m$^2$; melting point 250°0 C.) were used as air-permeable support members B. Onto one surface of each of these layers, a polyester-based hot melt adhesive (Diabond DH598B, produced by Nogawa Chemical Co., Ltd.) was applied at a rate of 6 g/m$^2$. Then, the PTFE porous membrane was sandwiched between these two air-permeable support members B, then the laminate was contacted with a heat roll at a line speed of 10 m/min at 180° C. and integrated by heat melt bonding. Thus, a filter medium that exhibits a pressure loss of 14.6 mmH$_2$O, collection efficiency of 99.91%, and a PF value of 20.9 was obtained.

EXAMPLE 7

Two layers of a nonwoven comprising filaments having a PET core component and a PBT sheath component (produced by Toyobo Co., Ltd.; product name, BULCOMPO HP6060G; fineness, 8 denier; basis weight 60 g/m$^2$; melting point of PET, 265° C.; melting point of PBT, 216° C.) were used as air-permeable support members C. Then, the PTFE porous membrane was sandwiched between these two air-permeable support members C, then the laminate was contacted with a heat roll at a line speed of 10 m/min at 220° C. and integrated by heat melt bonding. Thus, a filter medium that exhibits a pressure loss of 15.1 mmH$_2$O, collection efficiency of 99.92%, and a PF value of 20.5 was obtained.

EXAMPLE 8

Two layers of a nonwoven comprising blended PET/low melting PET filaments (produced by UNITIKA, LTD.; product name, MARIX 90703WSO; fineness, 2 denier; basis weight 70 g/m$^2$; melting point of PET, 264° C.; melting point of low melting PET, 238° C.) were used as air-permeable support members D. Then, the PTFE porous membrane was sandwiched between these two air-permeable support members D, then the laminate was contacted with a heat roll at a line speed of 10 m/min at 240° C. and integrated by heat melt bonding. Thus, a filter medium that exhibits a pressure loss of 14.8 mmH$_2$O, collection efficiency of 99.90%, and a PF value of 20.3 was obtained.

EXAMPLE 9

Two layers of a polyamide filament nonwoven (produced by Asahi Chemical Industry Co., Ltd.; product name, ELTAS NO1050; fineness, 2 denier; basis weight 50 g/m$^2$; melting point 223° C.) were prepared as air-permeable support members E. Onto one surface of each of these layers, a polyester-based hot melt adhesive (Diabond DH598B produced by Nogawa Chemical Co., Ltd.) was applied at a rate of 6 g/m$^2$. Then, the PTFE porous membrane was sandwiched between these two air-permeable support members E, then the laminate was contacted with a heat roll at a line speed of 10 m/min at 180° C. and integrated by heat melt bonding. Thus, a filter medium that exhibits a pressure loss of 14.2 mmH$_2$O, collection efficiency of 99.89%, and a PF value of 20.8 was obtained.

EXAMPLE 10

Two layers of a nonwoven comprising filaments having a PET core component and a low melting PET sheath component (produced by TORAY INDUSTRIES, INC.; product name, G5040; fineness, 2 denier; basis weight 40 g/m$^2$; melting point of PET, 264° C.; melting point of low melting PET, 234° C.) were prepared as air-permeable support members F. The PTFE porous membrane was sandwiched between these two air-permeable support members F, then the laminate was contacted with a heat roll at a line speed of 10 m/min at 240° C. and integrated by heat melt bonding. Thus, a filter medium that exhibits a pressure loss of 15.6 mmH$_2$O, collection efficiency of 99.95%, and a PF value of 21.2 was obtained.

The total amounts of organic substances in the air-permeable support members A to J of the thus obtained filter media of Examples 5 to 10 were as follows:

|  | Type of Air-Permeable Support Member | Total Amount of Organic Substances (ng/250 mg) |
| --- | --- | --- |
| Example 5 | A | 112 |
| Example 6 | B | 37 |
| Example 7 | C | 14 |
| Example 8 | D | 69 |
| Example 9 | E | 684 |
| Example 10 | F | 100 |

INDUSTRIAL APPLICABILITY

As mentioned above, the filter medium of the present invention exhibits high collection efficiency and low pressure loss. Moreover, its average pore diameter is larger than a conventional filter medium and can be controlled easily. Therefore, the filter medium of the present invention is most suitably used as a medium of an air filter. Also, an air filter unit using this filter medium can provide a considerably clean air with low running cost. Furthermore, the filter medium and air filter unit of the present invention can be applied over a wide range, and may be used as a filter medium and filter unit of each type of medium-performance, HEPA, ULPA, and the like. Thus, the filter medium and filter unit of the present invention has high performance and can realize reduction of energy cost. Accordingly, by using them, for example, in a semiconductor manufacturing equipment, clean rooms, or the like, high quality of products and cost reduction can be achieved.

What is claimed is:

1. A filter medium comprising a polytetrafluoroethylene porous membrane, wherein an average pore diameter of the polytetrafluoroethylene porous membrane is more than 0.5 μm and exhibits a pressure loss when air is passed through the medium at a flow velocity of 5.3 cm/sec is from 2 to 50 mmH$_2$O, and a PF value calculated from the pressure loss and a collection efficiency using dioctylphthalate of a particle size of 0.10 to 0.12 μm according to an equation (1) below is between 18 and 22

(Equation (1)

$$PF \text{ value} = \frac{-\log(\text{permeability}(\%)/100)}{\text{Pressure Loss}} \times 100$$

Permeability (%)=100−Collection Efficiency (%).

2. A filter medium according to claim 1, wherein the polytetrafluoroethylene porous membrane is formed from intertwining polytetrafluoroethylene fibers, the polytetrafluoroethylene fibers having an average diameter of 0.1 to 0.2 μm.

3. A filter medium according to claim 1, wherein an average pore diameter of the polytetrafluoroethylene porous membrane is from 0.58 to 5 μm, and a pressure loss when air is passed through the medium at a flow velocity of 5.3 cm/sec is from 2 to 50 mmH$_2$O.

4. A filter medium according to claim 1, wherein an average pore diameter of the polytetrafluoroethylene porous membrane is from 1.1 to 3 μm, and a pressure loss when air is passed through the medium at a flow velocity of 5.3 cm/sec is from 2 to 45 mmH$_2$O.

5. A filter medium according to claim 1, wherein a collection efficiency using dioctylphthalate of a particle size of 0.10 to 0.12 μm is at least 40%.

6. A filter medium according to claim 1, wherein a collection efficiency using dioctylphthalate of a particle size of 0.10 to 0.12 μm is at least 99.0%.

7. A filter medium according to claim 1, wherein a collection efficiency using dioctylphthalate of a particle size of 0.10 to 0.12 μm is at least 99.99%.

8. A filter medium according to claim 1, wherein an air-permeable support member is provided on at least one side of the polytetrafluoroethylene porous membrane.

9. A filter medium according to claim 8, wherein a total amount of organic substances detected from the air-permeable support member at 80° C. is not more than 1,000 ng per 250 mg of the air-permeable support member.

10. A filter medium according to claim 8, wherein a total amount of organic substances detected from the air-permeable support member at 80° C. is not more than 500 ng per 250 mg of the air-permeable support member.

11. A filter medium according to claim 8, wherein a total amount of organic substances detected from the air-permeable support member at 80° C. is not more than 150 ng per 250 mg of the air-permeable support member.

12. A filter medium according to claim 8, wherein the air-permeable support member is formed substantially from a material comprising at least one of polyamide and polyester.

13. A filter medium according to claim 8, wherein the air-permeable support member is formed substantially from a material comprising polyester and not containing polyolefin.

14. An air filter unit comprising a frame and a filter medium according to claim 1 which is folded in a corrugated form and housed in the frame, a gap between the frame and the filter medium being sealed.

* * * * *